Aug. 15, 1933.　　　A. M. GREIS　　　1,922,946
SWITCHING DEVICE
Filed Nov. 3, 1928　　　2 Sheets-Sheet 1
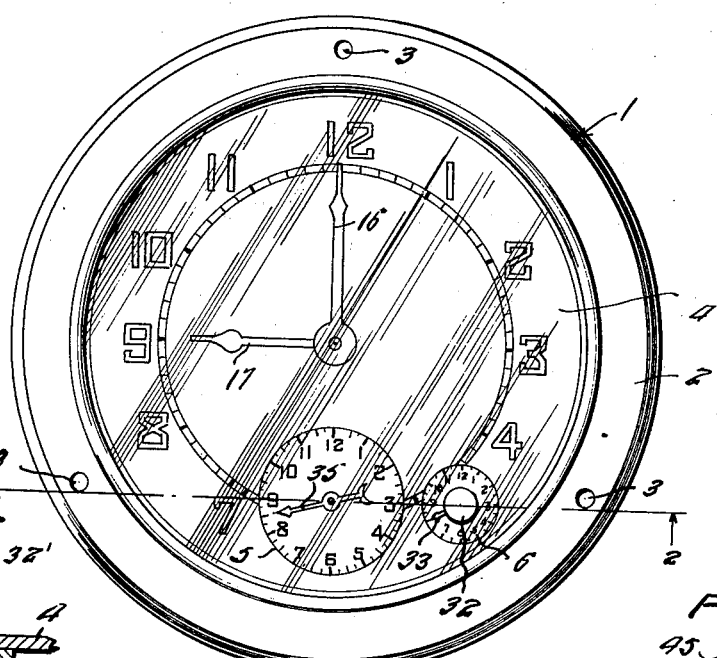
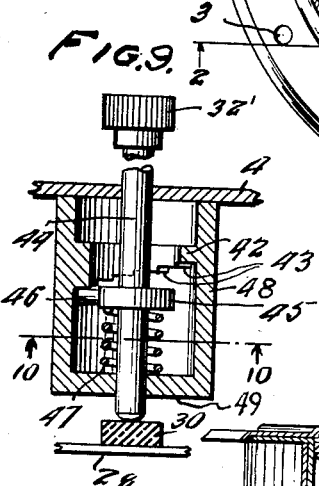
Inventor
ALPHONSE M. GREIS
By Semmes + Semmes
Attorneys Aug. 15, 1933.                A. M. GREIS                1,922,946
                          SWITCHING DEVICE
                         Filed Nov. 3, 1928            2 Sheets-Sheet 2
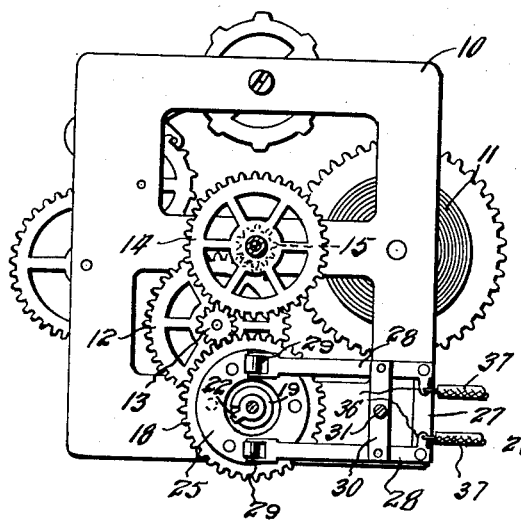
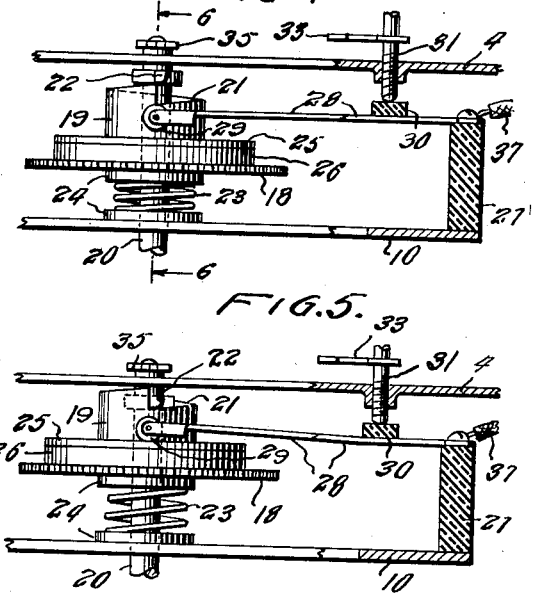
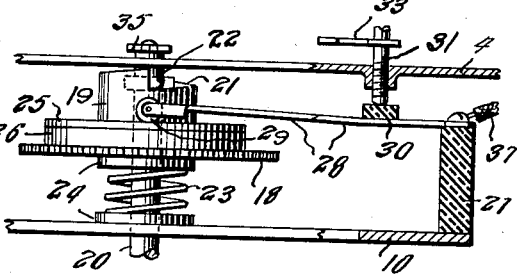
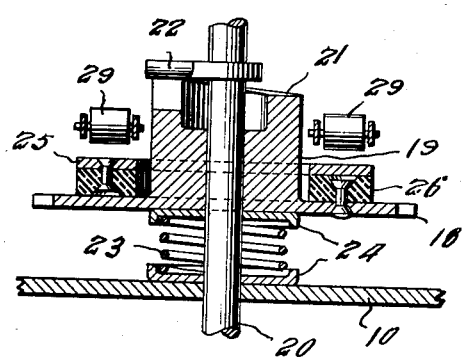
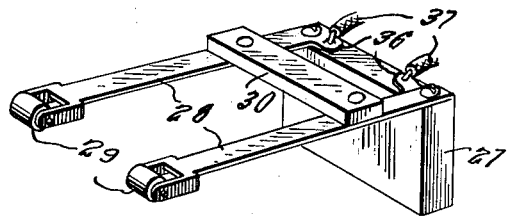
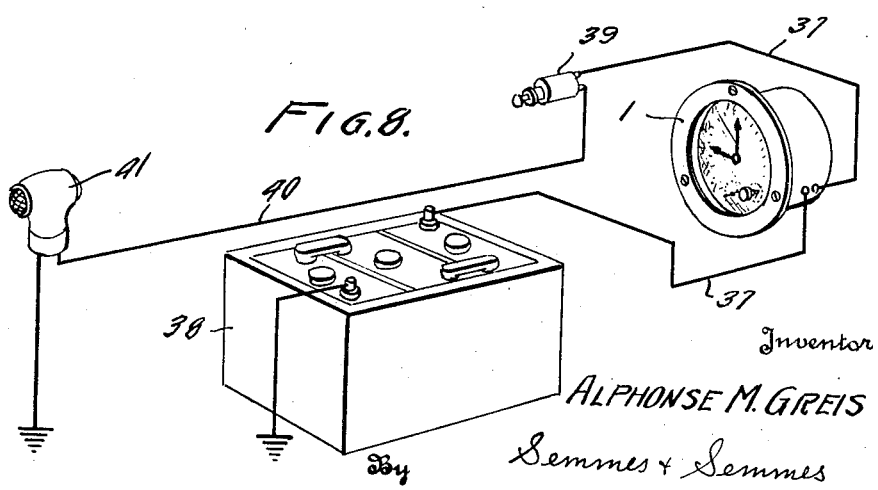
Inventor
ALPHONSE M. GREIS
By Semmes & Semmes
Attorneys Patented Aug. 15, 1933

1,922,946

UNITED STATES PATENT OFFICE 1,922,946

SWITCHING DEVICE

Alphonse M. Greis, Hartsdale, N. Y., assignor of one-half to Walter L. Biery, New York, N. Y.

Application November 3, 1928. Serial No. 316,963

5 Claims. (Cl. 58—19)

This invention relates to switches for controlling electrical devices and more particularly to clock mechanism controlled switches adapted to effect the operation of electrically operated devices over definite predetermined periods of time.

In many electric light installations it is desirable to have the lights put into operation at a predetermined time. Also in order to prevent the unnecessary use or waste of electrical energy it is advantageous to have the lights put out of operation at a time when they are no longer needed or at any other predetermined time.

One particular instance where it is desirable to have a light turned on at a predetermined time and turned off after operating during a certain period of time is in the parking light circuits on automobiles. In many localities the traffic regulations require that a light be exhibited on vehicles standing or parked on public highways over certain periods of time. Even in localities where there are no such regulations it is desirable to have a light on a parked vehicle after dark in order to prevent accidents and damage both to the parked vehicle and to any other vehicle which due to the lack of a proper signal light on the parked vehicle, might collide therewith.

Many devices have been developed for displaying lights on vehicles while parked or standing, which will give a maximum signal intensity from a minimum amount of energy.

Among these devices are the electrically illuminated parking lights which are quite satisfactory for the purpose of preventing accidents. Ofttimes, however, the operator of the vehicle equipped with proper signal devices forgets to turn on the light which may result in consequences quite as serious as if the vehicle had not been equipped with any signal device. Also in many cases where vehicles are left parked all night, the operator may forget to shut off the light in the morning and thereby cause an unnecessary drain of electrical energy from the storage battery.

The last mentioned disadvantage may cause much trouble since if the light is left on for a long enough time the battery will become completely discharged, and before the vehicle can be used it will be necessary that the battery be recharged. This results in an increase in the operating cost of the vehicle and a waste of time on the part of the operator.

Although mechanical devices have been constructed for turning electric lights on and keeping them on over certain periods of time the majority of such devices are complex and costly. Also most of the devices heretofore developed have been delicately constructed and would not be suitable for use on automotive vehicles, which are subjected to shocks and vibrations.

Thus in spite of the many improvements in devices for displaying signal lights, there have not as yet been any devices developed which are completely satisfactory for displaying lights on parked vehicles after dark.

An object of this invention is to provide a mechanism which will eliminate the disadvantages inherent in the types of parking light systems heretofore used.

Another object of this invention is to devise a switch mechanism suitable for effecting the operation of electrical devices over varying periods of time.

Another object of this invention is to provide an improved general construction of time controlled switch which is especially adapted for use in closing an electrical circuit and retaining the same in a closed condition over any predetermined period of time.

Another object of this invention is to provide a clock mechanism controlled switch which is so constructed that it can be effectively used for closing electrical circuits on automotive vehicles.

Still another object of this invention is to provide a clock mechanism operated switch which is constructed of few parts, is positive in action and is of a sufficiently rugged construction to effectively operate on automotive vehicles to close electrical circuits and for retaining said circuits closed over predetermined periods of time.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

This invention consists in the provision of a clock mechanism operated switch in an electrical circuit. The switch mechanism may be used in any electrical circuit where it is desired to connect a source of electrical energy to a device to be energized at a predetermined time, and for a predetermined period of time. One particular installation embodying my invention is in a parking light circuit for an automotive vehicle. In such an installation one terminal of each, the parking light and the battery, are connected to the chassis frame of the vehicle. The other terminals are connected to each other by suitable wiring in which are interposed an ordinary manually operated switch, and my novel clock mechanism operated switching device.

The time controlled device comprises a clock mechanism which controls the operation of a switching mechanism. A gear wheel is mounted with relation to the clock mechanism so as to mesh with a certain pinion of the clock mechanism which is rotated at a predetermined rate. This gear wheel is mounted on a shaft, on which it is adapted to slide. Connected with the gear wheel is a cam surface which is adapted to cooperate with a pin carried by the shaft to cause the gear wheel to slide on the shaft when it is rotated by the clock mechanism. Suitable spring means are provided to hold the cam surface of the gear wheel in contact with the pin with which it cooperates. An annular current conducting member formed of material having good electrical conducting properties is mounted on the gear wheel in such a manner as to be insulated therefrom and to rotate therewith.

A pair of contactors or brushes are mounted so as to contact with the aforementioned annular conducting member when the sliding gear is in certain positions on its shaft. Wires connecting a light with a source of electrical energy are connected with these contactors. The position of the contactors relative to the contacting member may be varied by suitable adjusting means which move the contactors. When the clock mechanism rotates the gear to a position where the lowest portion of the cam engages with the cooperating pin the gear will be in such a position on its shaft that the annular contacting member will engage with the contactors, and an electric current can pass through one of the contacts into the annular contacting member and from there into the other contact and on to the device to be energized.

As the gear wheel is rotated by the clock mechanism the cam surface forces the gear away from the contactors so that after a sufficient time the connections between the contactors and the annular contacting member will be broken. By operating the adjusting means, the contactors can be held in engagement with the annular conducting member over any predetermined period of time.

In order to make my invention more clearly understood I have shown in the accompanying drawings means for carrying the same into practical effect, without limiting the improvements in their useful applications to the particular constructions, which for the purpose of explanation, have been made the subject of illustration.

In the drawings:

Figure 1 is a plan view of the novel time controlled switching device which forms the subject matter of the present invention.

Fig. 2 is a view taken on line 2—2 of Fig. 1 showing the constructional details of the switch mechanism.

Fig. 3 is a view of the clock mechanism showing the switching device mounted in operative position.

Fig. 4 is a detailed view showing the relation of the contactors with the clock mechanism operated sliding gear when the adjustable pin is in contact with the high point of the cam surface, and the means for attaching the contactors to the clock mechanism.

Fig. 5 is a view similar to Fig. 4 showing the clock mechanism controlled sliding gear in contact with the contacting members when the adjustable pin is in engagement with the lowest portion of the cam surface.

Fig. 6 is a detailed sectional view taken on line 6—6 of Fig. 4 showing the manner in which the annular contacting member is mounted on the sliding gear.

Fig. 7 is a detailed perspective view of the contactors and the means of mounting them on the clock frame.

Fig. 8 is a diagrammatical representation of a parking light system for an automotive vehicle embodying my novel time controlled switching device.

Fig. 9 is a detailed sectional view of a modified mechanism for adjusting the length of time the switch is to be closed.

Fig. 10 is a sectional view taken on line 10—10 of Fig. 9.

Referring to the drawings there is shown in Fig. 1 a clock mechanism controlled electrical switch 1 which appears to be an ordinary clock. The clock mechanism operated switch shown, is arranged in a casing 7 provided with a rim 2 having a plurality of apertures 3 for mounting it on an instrument board of an automobile. This switching device has an ordinary clock dial 4 provided with indicia for indicating time, and with the usual set of indicia or dial 5 commonly used for disclosing the time the alarm will sound. In addition to the ordinary indicia common to clocks, the dial 4 of the time controlled switch is provided with another set of indicia or dial 6 for disclosing to the operator, the length of time the switch will remain in a closed position.

The dial and the indicating pointers or hands are protected by a glass 8 which is mounted in the casing 7. A suitable annular member 9 is mounted between the dial 4 and the glass 8 and serves to properly space the glass from the dial and indicating pointers or hands to permit free movement of the latter.

As is more clearly shown in Fig. 3 the clock mechanism for operating the switching device comprises a frame 10 which supports the spring motor 11 and its associated gear train. The spring motor and gear train may be of any type of construction suitable for use in a clock mechanism. In Fig. 3, gear 12 and pinion 13 are shown mounted on a shaft which is driven by the spring motor at a constant speed. Gear 12 meshes with pinion 15 which is connected with the minute hand 16, and pinion 13 meshes with gear 14 which is connected with the hour hand 17. It is to be noted that gear 14 and pinion 15 are not fixed to the same shaft but are arranged so that the minute hand may rotate at a speed twelve times as fast as the speed of the hour hand. Engaging with the teeth of pinion 13 is a gear wheel 18, of the same size as the gear 14 which carries the hour hand 17, so that gear 18 rotates at the same speed as gear 14.

The gear 18 is connected or formed integrally with a hub or sleeve 19 which is loosely mounted on shaft 20, so that it may freely rotate and slide thereon. As is clearly shown in Figs. 2 to 6 the unattached end of the sleeve or hub 19 is formed so as to present a cam surface 21. The cam surface 21 is of such a pitch and so cooperates with a pin, that as the gear 18 together with its hub rotates on shaft 20 the gear will be slid on the shaft. Mounted on the shaft 20 is the pin 22 which is adapted to engage with the cam surface 21 formed on the end of the hub 19.

Shaft 20 is equipped with a thumb screw 34 whereby the shaft and its pin 22 may be rotated to various positions, so that the pin 22 can engage with the lowest portion of the cam at any desired time. Shaft 20 also carries a pointer or hand 35 adapted to cooperate with indicia 5 for disclosing the time when the pin 22 will engage with the lowest portion of the cam surface 21.

A suitable spring 23 is placed around shaft 20, between gear 18 and frame 10 of the clock mechanism and operates to force the cam surface into engagement with the pin 22. Suitable spring retaining means 24 may be provided on the frame 10 and on the gear 18 so that the spring 23 will always be in the proper position to retain the cam surface 21 in cooperative relation with the pin 22.

The gear 18 with its attached hub 19 is adapted to rotate in a clockwise direction, and with the pin 22 engaging the lowest portion of the cam surface, the gear 18 as shown in Fig. 5 will be in an upward position, that is, in a position closer to the dial 4 than in any other position. However, as the gear wheel 18 is rotated by the clock mechanism the cam surface will cause the gear 18 to be slid on shaft 20 until it reaches a position such as is shown in Fig. 4, that is, in a position further away from the dial 4 than in any other position. When the high point of the cam surface 21 of the hub 19 clears the pin 22, the hub and gear immediately move so that the lowest portion of the cam surface engages with the pin 22 as shown in Fig. 5.

Attached to the gear 18 is an annular current conducting member 25. This member 25 is electrically insulated from the gear 18 by means of suitable insulating material 26. As is clearly shown in Fig. 6, the annular current conducting member 25 is connected to the insulating portion 26 and the latter is connected to gear 18 in such a manner that the conducting member is completely insulated from the gear 18.

Mounted on the frame 10 of the clock mechanism is a suitable block or support 27 formed of electrical insulating material. Attached to the block 27 is a pair of spring contacting members 28 which are formed of any material suitable for conducting an electric current. These members are preferably formed of material having sufficient elasticity to retain them in a desired position. Mounted on the free end of each of the contacting members 28 is a shaft carrying a roller 29 which is adapted to engage the annular current conducting member 25 attached to gear 18. The block or support 27 together with its supported contacting arms 28 is so arranged on the frame 10 that the rollers 29 will be arranged adjacent the annular member 25. The arrangement of the contacting arms 28 with relation to the annular member 25 is shown clearly in Figs. 2 to 6 of the drawings.

A strip of insulating material 30 is connected by suitable securing means to the arms 28. This strip serves a double purpose, namely that of retaining the roller carrying arms 28 the proper distance apart and as a means for moving the arms 28 for regulating the distance between the rollers 29 and the annular conducting member 25. By observing Figs. 2, 4 and 5 it will be seen that a threaded shaft 31 is mounted in a threaded boss carried by the dial 4 of the clock mechanism. Shaft 31 is provided with a thumb screw 32 for adjusting it to various positions. The free end of the shaft 31 is adapted to engage with the insulating strip 30 to move the rollers 29 to a position closer to the annular conducting member 25.

Since the arms 28 carrying the rollers 29 are formed of spring material they are normally in a position that will not be engaged by the annular conducting member 25 even when the lowest portion of the cam surface 21 is in engagement with the pin 22. By so adjusting the threaded shaft 31 the arms 28 can be displaced so that the rollers 29 will be in engagement with the annular conducting member 25 at all positions it may take on the shaft 20. The shaft 31 is also provided with a pointer or hand 33 which cooperates with the indicia 6 to disclose the length of time the annular conducting member is to be in engagement with the rollers 29 of the contacting arms 28.

It will be seen that by moving the arms 28 carrying the rollers 29 closer to the annular conducting member 25, the time of engagement of the rollers 29 with the member 25 will be longer than if the rollers 29 were at a position further away from the member 25.

A somewhat modified form of mechanism for adjusting the position of the roller carrying arm 28 is shown in Figs. 9 and 10. Instead of the screw threaded boss in which is threaded the adjusting screw 31, the dial 4 has mounted thereon a cylindrical member 48. The free end of the cylinder has an end member 49 which serves as a support for shaft 44, and as a means for retaining the spring 47 in operative position. The end member 49 is provided with a centrally located aperture through which the shaft 44 extends. Dial 44 is provided with an aperture aligned with that in the end member 49. End member 49 and dial 3 serve as supports for the adjusting shaft 44.

An annular shoulder 42 is formed on the interior wall of the cylinder 48. One surface of the shoulder is so formed as to provide a series of steps 43. As shown in Figs. 9 and 10 there are 12 steps, each being positioned at a different distance from the dial 4. The steps are so constructed that any two adjacent steps are spaced apart, axially of the cylinder, a distance equal to that between any other two steps.

An annular shoulder or flange 45 is mounted on the shaft 44 and carries a pin 46 adapted to cooperate with the stepped shoulder 44. A spring 47 is provided to retain the pin 46 in position on any one of the steps. This spring is placed about the shaft 44 between the end member 49 and flange 45. The shaft 44 is provided with an adjusting knob 32' and a pointer not shown, adapted to cooperate with a suitable dial to indicate which of the steps the pin 46 is engaging, or to indicate the length of time the rollers 29 are to be in contact with the annular conducting member 25.

In operation the knob 32' is pushed in to disengage the pin 46 from one of the steps 43. After the pin is free, the knob is turned until the pointer is at the desired position, then the shaft is allowed to be forced by the action of the spring 47 onto the desired step. It will be seen that at each step with which the pin 46 engages, the rollers 29 will be spaced from the dial at a distance corresponding to the distance of the bearing surface of the step from the dial 4. Thus, by placing the pin on a certain step, the rollers carried by arms 29 will be in such a position that they will contact with the member 25 for a predetermined period of time.

The arms 28 are provided with tabs 36 to which are connected electrical conduits 37. One of these conduits is connected to a source of electrical energy and the other is connected to a device to be energized. Thus when the rollers 29 are in engagement with the annular conducting member 25 an electric current can flow through one of the conduits 37 into one of the arms 28, through roller 29, into the annular conducting member 25 and thence to the other roller 29 and arm 28 to the other conduit 37.

Although in the foregoing disclosure there has been described a specific cam mechanism for sliding the gear 18 carrying the conducting member 25 on the shaft 20 I wish it to be clear that any other mechanism which would operate to slide the gear 18 with its attached current conducting member so that the latter would engage with the rollers 29 of the elastic arms 28 to complete an electrical circuit can be used.

In operation a time controlled switch 1 constructed in accordance with my invention may be connected in a parking light system such as is shown diagrammatically in Fig. 8. In this figure a storage battery 38 has one of its terminals connected to the frame of the vehicle. The other terminal of the battery is connected by a conduit 37 to one of the arms 28 of a time controlled switch such as has been hereinbefore described. The other conduit 37 connects the time controlled switch device to a suitable manually operated switch 39. From switch 39 a conduit 40 extends to one terminal of the parking light 41. The other terminal of the parking light 41 is connected to the frame of the vehicle.

When it is desired to have the parking light put into operation at a certain time the knob 34 is turned until the hand 39 points to the time at which the light is to be turned on. The knob 32 is then regulated until the hand 33 is pointed to one of the numbers of the indicia 6 to indicate the desired length of time the light is to be in operation. As the clock mechanism operates, the gear 18 is slowly rotated at the same speed as the hour hand 17.

When the hour hand 17 points to a position on dial 4 corresponding to the position of the hand 35 on dial 5 the cam of hub 19 will be in such a relation to pin 22 that the lowest point of the cam surface 21 will engage with the pin 22. This permits the gear 18 under the pressure of spring 23 to slide in a direction toward the dial 4. In sliding toward the dial 4 the annular contacting member carried by gear 18 engages with the rollers 29 of the contacting arms 28. This forms an electrical connection between the two conduits 37 in the manner previously described and current may flow from one of the conduits into the other.

As the gear 18 continues to rotate by the action of the clock mechanism the cam surface 21 gradually forces the gear 18 to slide on the shaft 20 against the action of the spring 23. Due to the spring action of the arms 28 the rollers 29 remain in contact with the annular conducting member 25 until a position is reached, determined by the adjustment of the shaft 31, at which contact between the rollers 29 and the annular conducting member 25 will be broken. Thus it will be seen that by a few simple adjustments a light can be automatically turned on at a predetermined time and will remain lighted for any desired length of time.

As shown in the drawings the gear 18 is so constructed and connected with the clock mechanism that it revolves through one complete revolution each twelve hours. Correspondingly the switching device operates over a maximum period of twelve hours. For many purposes this will be sufficient, but should it be found necessary the switching device can be designed to operate over twenty-four hour cycles.

Should it be desirable to have the device operate over twenty-four hour periods, it is merely necessary to so construct and connect gear 18 with the clock mechanism that it rotates once each twenty-four hours. The dials 5 and 6 could then be calibrated for twenty-four hour cycles instead of twelve hour cycles as shown in the drawings.

With the last described construction the time switch can be regulated to put the light into operation at a certain time of the day, for instance, at seven o'clock P. M. to effect the operation of the light until six o'clock A. M., when the switch would operate to break the circuit and keep the circuit open until seven o'clock P. M. of the next day, when the circuit would be again closed. Thus the light would be put into operation at a certain time each day and would be shut off when not needed by complete automatically operated mechanism.

While in the foregoing description I have described my invention as applied to a parking light circuit for an automobile I wish it to be clearly understood that the clock mechanism controlled switch may be used in any electrical circuit where it is desired to have the circuit closed at a predetermined time and to have it remain closed over any desired period of time. In installations where high power is employed a relay device controlled by the time switch may be used for closing and opening the high power circuit.

From the foregoing description it will be obvious that I have provided an automatic means for putting a light into operation at a predetermined time and for retaining it in a lighted condition over any desired period of time. It will also be appreciated that the time controlled switching device is formed of few parts and is of a simple rugged construction. This permits the device to be constructed at a relatively low cost and to be used where other devices for effecting the same results would not operate at all.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A switch mechanism comprising a clock operated sliding gear, an annular disc carried by said gear an adjustable pin for sliding said gear, a cam mounted on said gear adapted to cooperate with said adjustable pin, a pair of spring contactors adapted to engage with said disc, to close an electric circuit, roller members on the ends of each of the contactors adapted to have a rolling contact with the annular disk and means for adjusting said pin to effect contact between said disc and said contactors at a predetermined time.

2. A switch mechanism comprising a clock operated sliding gear, an annular disc carried by said gear, a cam mounted on said gear adapted to cooperate with an adjustable pin for sliding said gear, a pair of spring contactors adapted to engage with said disc, to close an electric circuit, rollers on the ends of the contactors to provide rolling contacts between the annular disk and the contactors, means for adjusting said pin to effect contact between said disc and said contactors at a predetermined time, and means for adjusting the position of said contactors for effecting contact between said contactors and said disc for a predetermined period of time.

3. A switch mechanism comprising a clock operated sliding gear, an annular disc carried by said gear, a cam mounted on said gear adapted to cooperate with an adjustable pin for sliding said gear, and a pair of spring contactors adapted to engage with said disc, to close an electric circuit, each of the contactors of said pair being bifurcated, a roller mounted in each bifurcation, means to insulate each of the contactors from each other and to hold them in fixedly spaced relation, said adjustable pin being mounted on a shaft carrying said sliding gear, a pointer mounted on said shaft adapted to cooperate with indicia, for indicating the time said circuit is to be closed.

4. A switch mechanism comprising a clock operated sliding gear, an annular disc carried by said gear, a cam mounted on said gear adapted to cooperate with an adjustable pin for sliding said gear, a pair of spring contactors adapted to engage with said disc, to close an electric circuit, means for insulating and fixedly holding said spring contactors in spaced relationship and means for adjusting the position of said contactors by engagement with the said insulating means for effecting contact between said contactors and said disc for a predetermined period of time, said last mentioned means comprising a threaded shaft, and means on said shaft adapted to cooperate with indicia to indicate the length of time said circuit is to be closed.

5. A switch mechanism comprising a clock operated sliding gear, an annular disc carried by said gear, a cam mounted on said gear adapted to cooperate with an adjustable pin for sliding said gear, a pair of spring contactors adapted to engage with said disc, to close an electric circuit, an insulating spacer bar for holding each of the spring contactors in said pair in spaced relationship, an insulating block upon which one end of each of the pair of contactors is mounted, means on the ends of each of the contactors opposite said insulating block for providing rolling contact between said contactors and said disk, means for adjusting said pin to effect contact between said disc and said contactors at a predetermined time, and means for adjusting the positions of said contactors for effecting contact between said contactors and said disc for a predetermined period of time, said pin being carried by a shaft, means on said shaft adapted to cooperate with indicia to indicate the time said circuit is to be closed, said means for adjusting the position of said contactors comprising a threaded shaft and means on said shaft adapted to cooperate with indicia to indicate the length of time said circuit is to be closed.

ALPHONSE M. GREIS.